United States Patent
Rajagopalan et al.

(10) Patent No.: US 7,693,145 B2
(45) Date of Patent: Apr. 6, 2010

(54) METHOD AND APPARATUS FOR DIRECT RECEPTION OF INBOUND DATA

(75) Inventors: Ashok Rajagopalan, San Jose, CA (US); Sriram Narasimhan, Cupertino, CA (US); Chetan Yaliwal, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1124 days.

(21) Appl. No.: 11/187,754

(22) Filed: Jul. 23, 2005

(65) Prior Publication Data

US 2006/0193317 A1    Aug. 31, 2006

Related U.S. Application Data

(60) Provisional application No. 60/657,481, filed on Feb. 28, 2005.

(51) Int. Cl.
*H04L 12/28* (2006.01)
(52) U.S. Cl. .................... 370/389; 370/412
(58) Field of Classification Search ............... 370/389
See application file for complete search history.

(56) References Cited

U.S. PATENT DOCUMENTS

| 5,367,643 | A | | 11/1994 | Chang et al. |
| 5,535,340 | A | * | 7/1996 | Bell et al. .................. 710/112 |
| 6,104,700 | A | | 8/2000 | Haddock et al. |
| 6,188,698 | B1 | | 2/2001 | Galand et al. |
| 6,574,195 | B2 | | 6/2003 | Roberts |
| 7,363,389 | B2 | * | 4/2008 | Collins et al. ............... 709/250 |
| 2006/0067346 | A1 | * | 3/2006 | Tucker et al. ............... 370/412 |
| 2007/0192515 | A1 | | 8/2007 | Kraus |

FOREIGN PATENT DOCUMENTS

WO    WO2004086177    10/2004

OTHER PUBLICATIONS

Narasimhan et al., Office Action dated Jul. 9, 2008, U.S. Appl. No. 11/258,539, filed Oct. 24, 2005.
Narasimhan et al., Office Action dated December 26, 2008, U.S. Appl. No. 11/258,539, filed Oct. 24, 2005.
Narasimhan et al., Final Office Action dated July 7, 2009, U.S. Appl. No. 11/258,539, filed Oct. 24, 2005.

* cited by examiner

*Primary Examiner*—Robert W Wilson (57) ABSTRACT

A method and apparatus for receiving inbound data on an I/O device wherein a request to receive inbound data is received. A direct-data-placement request-tag is generated and associated with a pre-allocated buffer when the request requires direct data placement. A non-direct-data-placement request-tag is generated when the request does not require direct data placement. The received request is then augmented with a generated request-tag and directed to a data interface unit. A data packet that includes a reply-tag and a payload is then received in the data interface unit. The payload is directed from the data interface unit into a pre-allocated buffer when the reply-tag correlates with a request-tag that is associated with a pre-allocated buffer. Otherwise, the payload is retrieved from the data interface unit when the reply-tag does not correlate with a request-tag that is associated with a pre-allocated buffer.

29 Claims, 9 Drawing Sheets

| REQUEST TABLE | | | |
|---|---|---|---|
| REQUEST ID | REQUESTING T-TAG | BUFFER ID | HANDLE |
| | | | |
| | | | |
| 271 | 275 | 280 | 285 |

METHOD AND APPARATUS FOR DIRECT RECEPTION OF INBOUND DATA

RELATED APPLICATIONS

This present application is related to a provisional application Ser. No. 60/657,481 filed on Feb. 28, 2005 entitled "METHOD AND APPARATUS FOR DIRECT RECEPTION OF INBOUND DATA", by Rajagopalan et al., currently pending, for which the priority date for this application is hereby claimed.

BACKGROUND

Today, modern processing systems are capable of performing millions upon millions of instructions every second. Even with all of this raw processing power, there are still some pretty basic bottle-necks when it comes to optimizing a processors performance. For example, in order to ensure that a processor can execute as many instructions as possible over a particular period of time, system designers go to painstaking lengths to ensure that a steady stream of instructions and/or data reaches the processor from the memory. When a memory can not provide instructions or data to a processor fast enough, the processor must idle—irrespective of how fast it can actually execute instructions.

Processors are also not always the best resource to apply when input and output operations need to be accomplished. For example, there is little to be gained by allowing a high-power processor to orchestrate the reception of inbound data from an external source (e.g. a data network). The processor is simply far too powerful of a resource to be troubled with low-speed data transfers. This is why a wide variety of new mechanisms have been devised where input and output processing is pushed off onto less valuable resources.

One mechanism that is often used to improve performance in a processing system is the application of intelligent peripherals. Intelligent peripherals respond to concise commands, which are typically received from an application that is executed by a processor in a processing system. One such command is an input request. An input request is a request to receive data from an external source and to place the data into a particular location in a memory, typically a buffer maintained by a protocol stack. An alternative form of an input request provides for delivery of data directly to the application.

It should be appreciated that, whatever form of an input request is generated by an application, there are several intermediary processes that affect the receipt of data from an external source and the delivery of that data to the application. The aforementioned protocol stack is a collection of software that is executed by a processor in a processing system. A protocol stack causes a processor to engage in a communications session in order to send or receive data. At a rudimentary level, the protocol stack either includes, or relies on a driver module. A driver module causes a processor to interact with a hardware device in order to actually transfer data from memory outward to an external destination or to receive data from an external source into the memory. The driver module is tailored to enable control of a specific hardware device by a processor as the processor executes the driver module.

Data that is received by an intelligent input device is often organized as data packets. Typically, a data packet includes a header and a payload. The header includes information that is used to direct the data to its ultimate destination while the payload comprises the data itself. Modernly, intelligent input devices are often able not only to distinguish between the header and the payload of a data packet, but are also able to provide some amount of protocol level processing. By performing some protocol level processing, a host processor can avoid executing some portion of a protocol stack when receiving input data.

One method for requesting inbound data is supported by a standard called Internet Small Computer Systems Interface (iSCSI). The iSCSI standard allows a level of abstraction whereby an application can request data from an external device, but wherein the external device is accessed over a network interface (e.g. the Internet). Using the iSCSI standard, an input device must carry along a header that defines a target device. When data is received, the input device must be cognizant of a similar header. The return header (which includes a reply tag) indicates the target of the inbound data, which is the original application. These connections are typically identified by source and destination addresses (and port numbers) and possibly additional consuming process information.

One problem with any type of intelligent input or output processing is that the protocols established rely on a pre-established means for transferring information. For example, an inbound data packet will be directed to an intermediate buffer maintained by a protocol stack. The data is then moved (i.e. copied) from the intermediate buffer to an application buffer in order to deliver the data to the application. The frustrating issue is that the first copy into the intermediate buffer is typically accomplished by a direct memory access mechanism. The second copy typically requires processor cycles to move information from one memory buffer to another, thereby consuming memory bandwidth unnecessarily.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
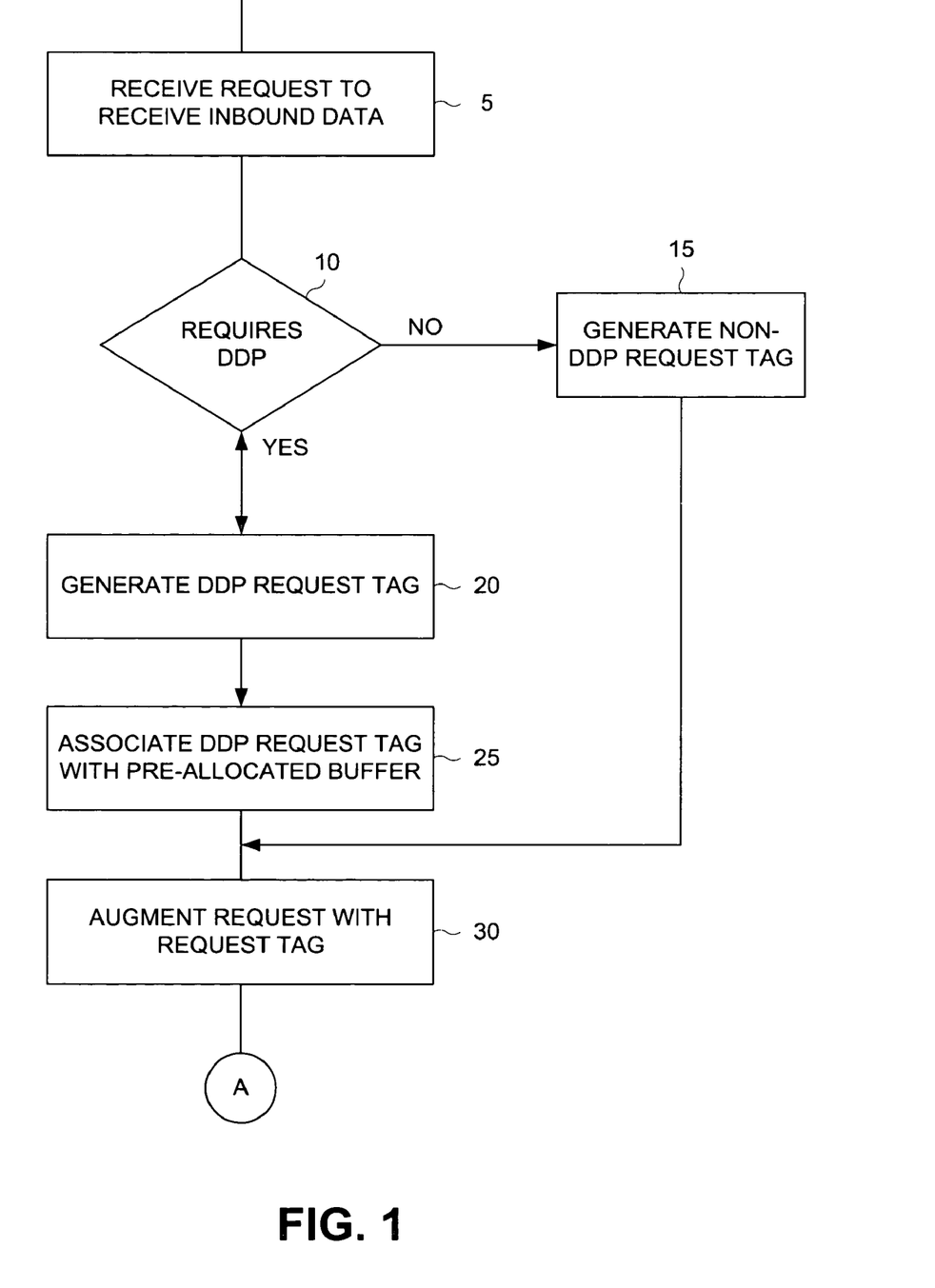
FIGS. 1 and 2 collectively constitute a flow diagram that depicts one example method for requesting and receiving inbound data.
Figure 2:
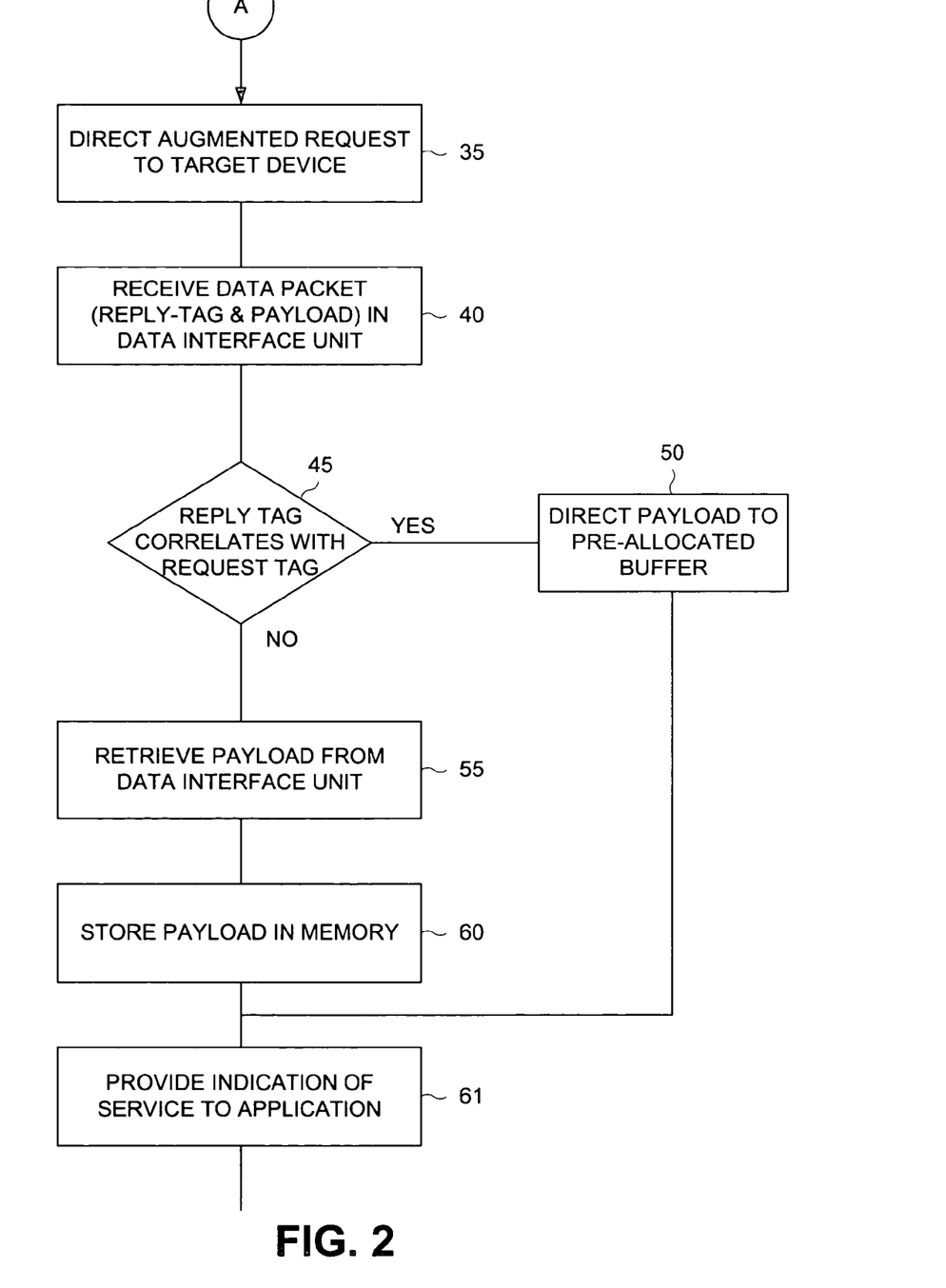

FIGS. 1 and 2 collectively constitute a flow diagram that depicts one example method for requesting and receiving inbound data. According to one illustrative use case, the present method is applied in a situation where an intelligent input device is used to retrieve information from a distal source. For example, an intelligent input device according to one illustrative use case comprises an Internet Small Computer System Interface (iSCSI) device. An iSCSI input device receives a command from a host processor wherein the command provides for receiving a quantum of data from a distal source. A functional module known as a remote data manager is executed by the processor in order to affect the iSCSI command. A protocol stack, which is also executed by a processor in a processing system, is typically called upon by the remote data manager in order to provide communications between a distal data source and the remote data manager. The iSCSI command is generated in accordance with an input request, which is provided by an application executed by the processor.

According to one example method, receiving inbound data is accomplished by receiving a request to receive such inbound data (step 5). It should be appreciated that the request is typically received from an application which is requesting data from a distal source. According to this example method, a determination is made as to whether or not the request to receive inbound data requires direct-data-placement (DDP). The term direct-data-placement is used herein in a generic sense and is not to be confused with a protocol for storing data that is known by the same name.

According to one example variation of the present method, determination as to whether or not a particular request to receive inbound data requires direct-data-placement is accomplished by determining an amount of data that is to be received according to the request and comparing the determined amount of data to a copy threshold. It should be appreciated that the copy threshold comprises a pre-established limit as to the amount of data that should be accepted and processed in an ordinary manner, i.e. without direct-data-placement. It should further be appreciated that, according to this variation of the present method, the copy threshold is established in an empirical manner.

The copy threshold is established in accordance with an efficiency of a standard method for processing inbound data. That is to say, there is a certain threshold wherein a smaller size of an amount of data can be more efficiently processed without direct-data-placement. Based on the determination as to whether or not direct-data-placement is required, a request-tag is generated. It should be appreciated that when direct-data-placement is required (step 10), a direct-data-placement request-tag is generated (step 20). In the event that direct-data-placement is not required (step 10), a non-direct-data-placement request-tag is generated (step 15). Once a request-tag is generated, a request to receive inbound data is augmented with the generated request-tag (step 30). This tag is included in a header that is directed to an I/O device. It should further be appreciated that, according to this example method, a direct-data-placement request-tag is associated with a pre-allocated buffer (step 25), wherein the pre-allocated buffer is provided by an application.

Once the augmented request is so assembled, it is directed to a target device (step 35). It should be appreciated that a target device, according to various alternative variations of the present method, comprises a distal storage device (e.g. a network-based hard disk drive). In response to receiving the augmented request, a target device provides data packets back to an input device, which is typically closely coupled to a host processor. Accordingly, an input device receives a data packet (step 40). Typically, a data packet will include a reply-tag and a payload. The reply-tag generally provides information for directing the data received from a distal data source (e.g. a network-based storage device) to a particular buffer. It should be appreciated that the input device, according to one illustrative use case, does not necessarily need to provide any type of data separation, i.e. separation of a header and payload commensurate with the teachings of a particular protocol standard.

Once the data packet is received, an associated reply-tag is used to determine the type of processing that needs to be performed in order to receive a data. According to this example variation of the present method, when the reply-tag correlates with a request-tag that is associated with a pre-allocated buffer (step 45), a payload portion of the received data packet is directed to the pre-allocated buffer (step 50). Accordingly, when this method is applied, the data is directly placed in the pre-allocated buffer. In the event that a reply-tag that is received with the data packet does not correlate with a request-tag that is associated with a pre-allocated buffer, the payload is retrieved directly from the data interface unit (step 55). It should be appreciated that the payload is typically retrieved by action of a processor, as it executes various functional modules such as a protocol stack or a driver module.

Once a processor retrieves a payload portion of a data packet from the data interface unit, the data payload is stored in memory (step 60). According to one variation of the present method, an indication of a service completion is provided to an application (step 61).

Figure 2A:
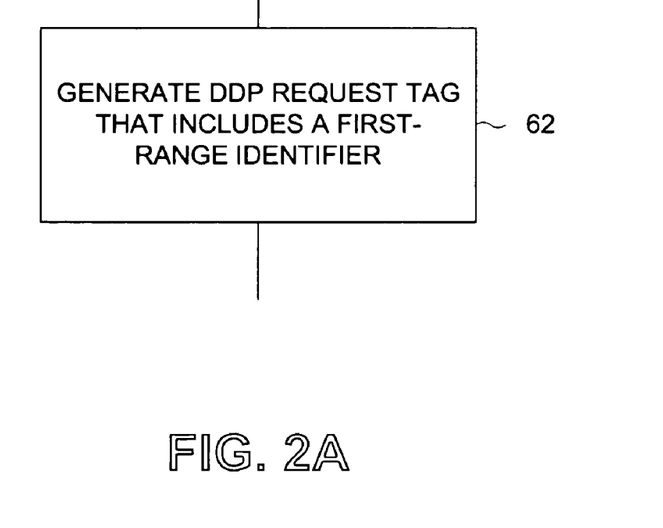
FIG. 2A is a flow diagram that depicts one alternative method for generating a direct-data-placement request-tag.

FIG. 2A is a flow diagram that depicts one alternative method for generating a direct-data-placement request-tag. It should be appreciated that a direct-data-placement request-tag needs to be differentiated from other types of request-tags. It should also be appreciated that a request-tag, according to this variation of the present method, includes an identifier, which is used to identify a particular request-tag according to a type of request-tag. According to this variation of the present method, generating a direct-data-placement request-tag is accomplished by generating a data-direct-data-placement request-tag that includes an identifier in a first-set (step 62). For example, an identifier in a first-range, say, for example between 0 and 15, is used to identify a request-tag as a direct-data-placement request-tag. It should be appreciated that the specified first-range of 0 to 15 is presented herein merely to illustrate one variation of the present method and is not intended to limit the scope of the claims appended hereto. As such, an identifier included in a request-tag, according to this variation of the present method, is used to distinguish a direct-data-placement request-tag from other types of request-tags.

Figure 2B:
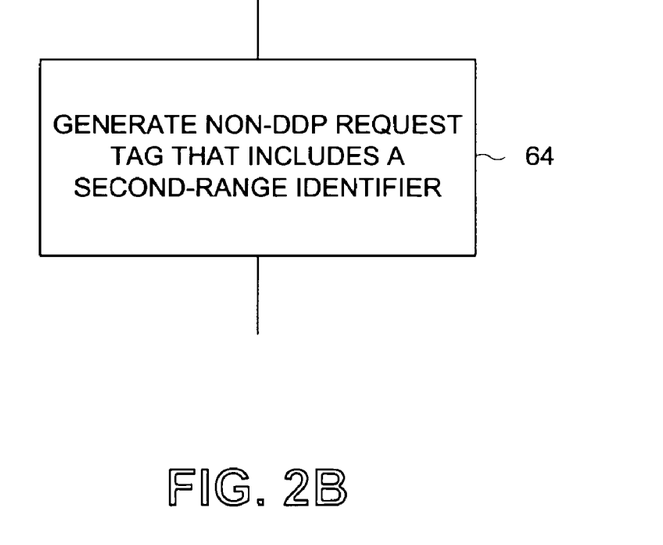
FIG. 2B is a flow diagram that depicts one alternative method for generating a non-direct-data-placement request-tag.

FIG. 2B is a flow diagram that depicts one alternative method for generating a non-direct-data-placement request-tag. According to this example variation of the present method, a non-direct-data-placement request-tag is generated by generating a request-tag (i.e., a non-data-direct-placement request-tag) that includes a second-range identifier (step 64). For example, an identifier included in a non-direct-data-placement request-tag can be set in a range between 16 and 31. Again, this range of identifiers is provided herein merely to illustrate one variation of the present method and is not intended to limit the scope of the claims appended hereto. As such, an identifier included in a request-tag, according to this variation of the present method, is used to distinguish a non-direct-data-placement request-tag from other types of request-tags.

Figure 3:
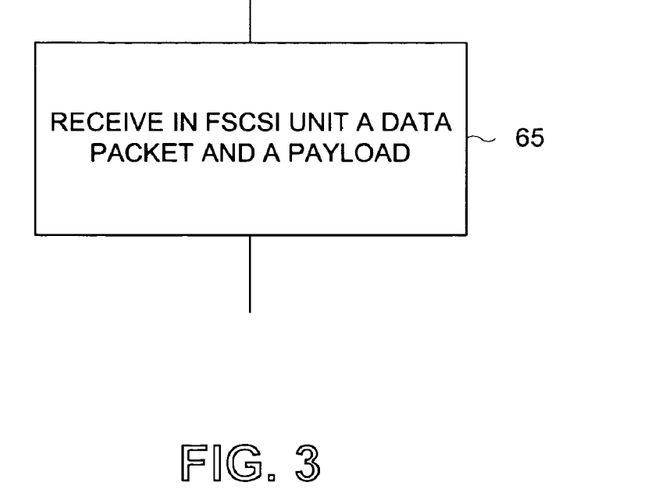
FIG. 3 is a flow diagram that depicts one alternative method for receiving a data packet in a data input unit.

FIG. 3 is a flow diagram that depicts one alternative method for receiving a data packet in a data input unit. According to this example variation of the present method, a data packet is received in an Internet Small Computer Systems Interface input unit. (Step 65). As such, one variation of the present method is applicable where an input device comprises an iSCSI device as heretofore described.

Figure 4:
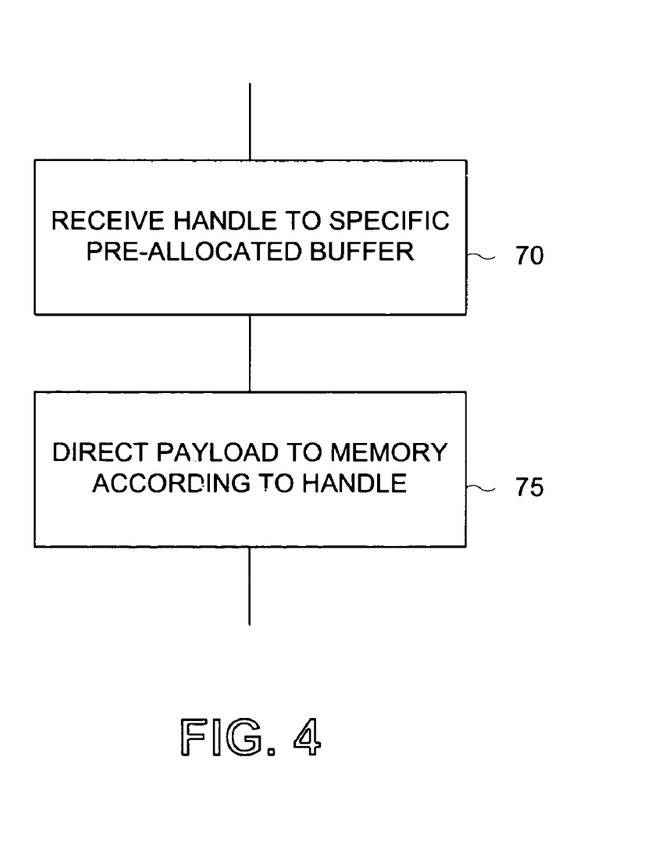
FIG. 4 is a flow diagram that depicts one example method for directing a payload of data into it pre-allocated buffer.

FIG. 4 is a flow diagram that depicts one example method for directing a payload of data into a pre-allocated buffer. According to this example variation of the present method, directing a data payload into a specific pre-allocated buffer is accomplished by receiving a handle to the pre-allocated buffer (step 70). It should be appreciated that, according to one variation of the present method, a handle is received in the remote data manager from an application, wherein both the remote data manager and the application are functional modules executed by a processor. In yet another variation of the present method, a handle to a specific pre-allocated buffer is received in an input device. It should be appreciated that where the handle is received in an input device, the input device is typically capable of providing direct-data-placement services.

Figure 5:
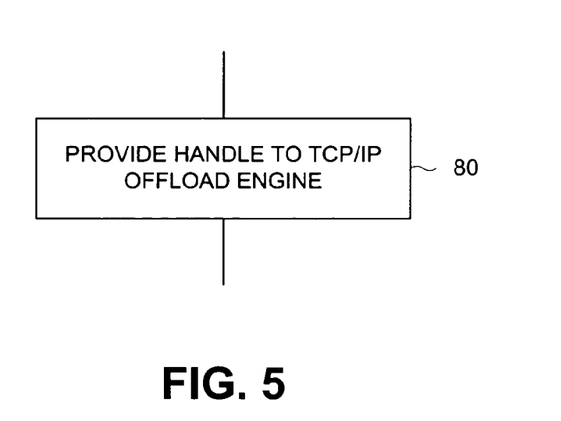
FIG. 5 is a flow diagram that depicts one alternative method for receiving a handle.

FIG. 5 is a flow diagram that depicts one alternative method for receiving a handle. According to this alternative example variation of the present method, a handle is received in a TCP/IP protocol offload engine (step 80). As already discussed, an input device that provides direct-data-placement services accepts a handle according to this variation of the present method. Accordingly, a TCP/IP offload engine then uses the handle in order to direct a payload of data into a specific pre-allocated buffer located in a memory.

Figure 6:
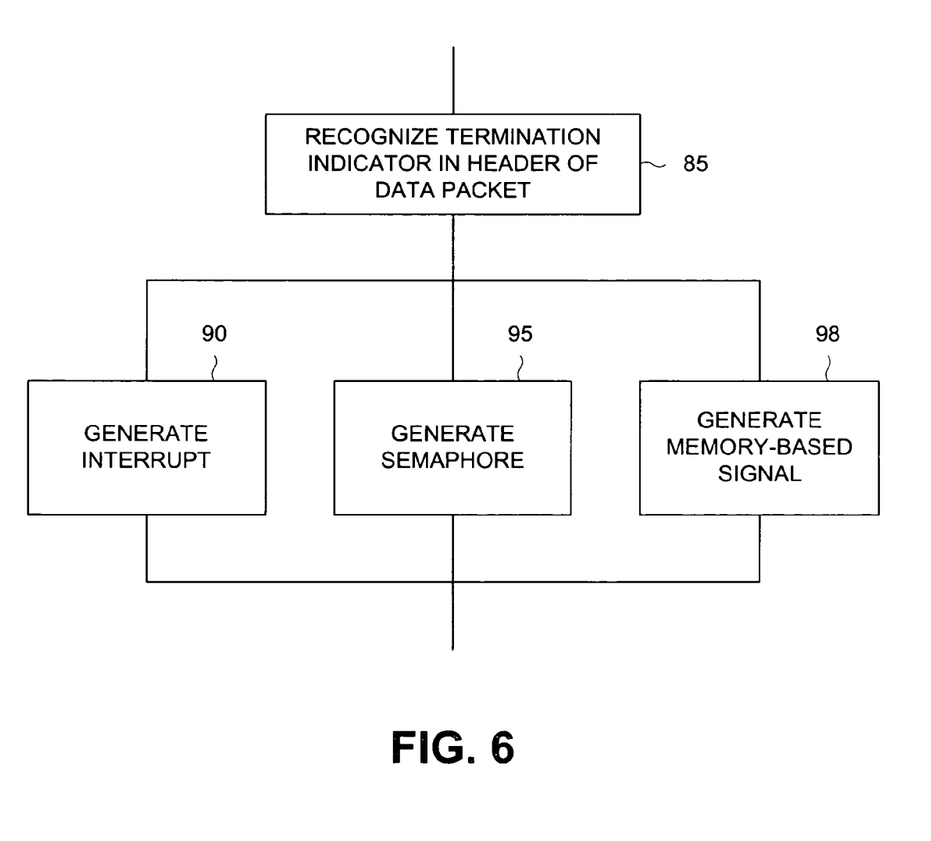
FIG. 6 is a flow diagram that depicts alternative example methods for providing an indication to a processor once inbound data is processed.

FIG. 6 is a flow diagram that depicts alternative example methods for providing an indication to a processor once inbound data is processed. According to one example alternative method, an indication is provided to a processor by recognizing a termination indicator that is included in a header of a data packet (step 85). For example, a termination indicator, according to one alternative example embodiment, includes an end-of-frame indicator. In yet another example embodiment, the termination indicator is received as a separate header packet.

Once a termination indicator is recognized, one alternative example method provides for generating an interrupt (step 90). The processor is then required to service the interrupt. According to yet another alternative example method, a semaphore is generated (step 95). In this alternative example method, the semaphore is managed in conjunction with an application to which inbound data is to be directed to. In yet another alternative example method, a memory-based signal is generated (step 98).

Figure 7:
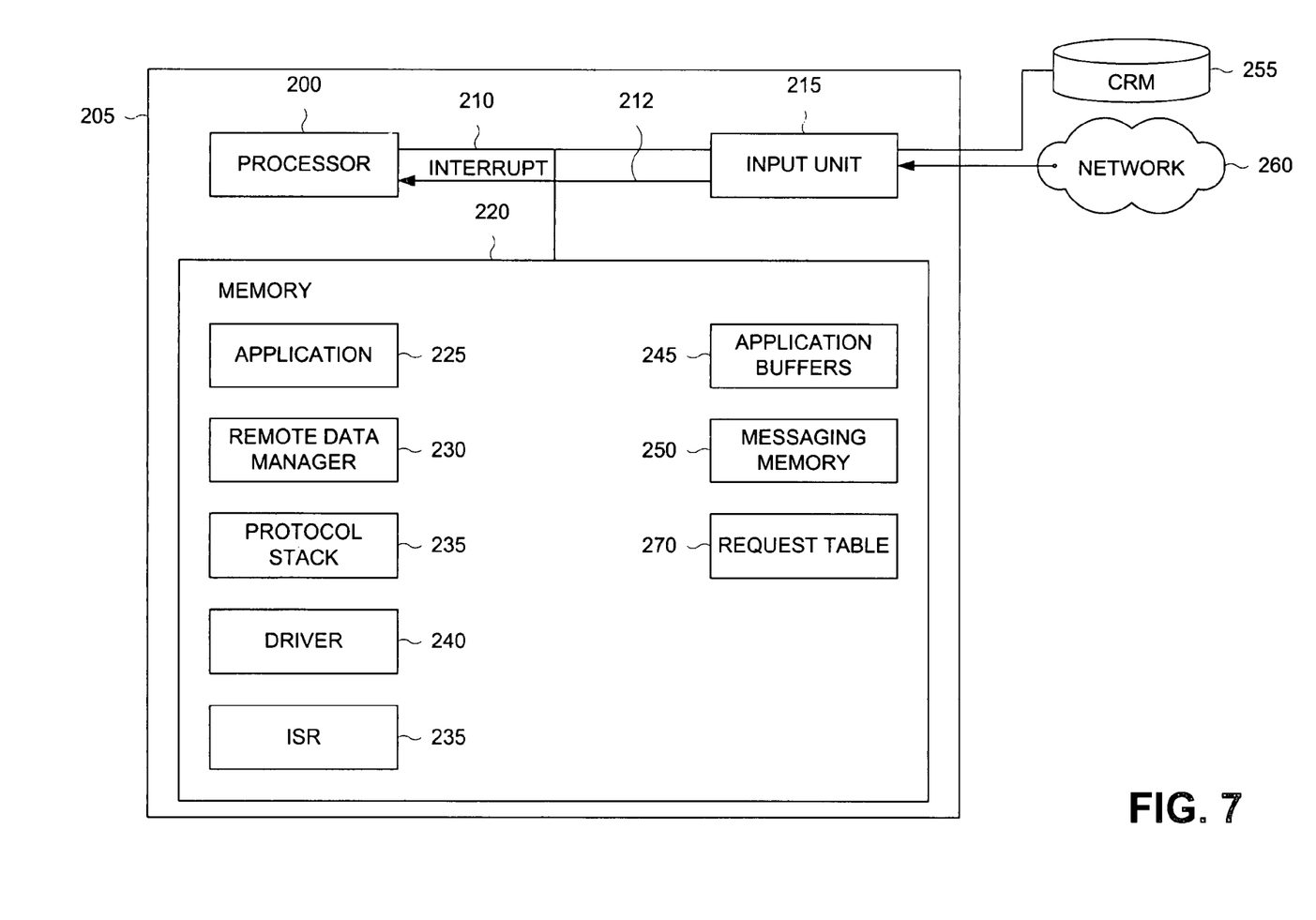
FIG. 7 is a block diagram that depicts several example alternative embodiments of a system for receiving inbound data.

FIG. 7 is a block diagram that depicts several example alternative embodiments of a system for receiving inbound data. According to one alternative example embodiment, a system for receiving inbound data 205 comprises a processor 200, a memory 220 and an input unit 215. It should be appreciated that these elements are communicatively associated with each other by means of an interconnect 210. In one alternative embodiment, the input unit 215 is capable of generating an interrupt signal 212 when a quantum of inbound data is received. According to alternative example embodiment, the input unit 215 is capable of receiving a quantum of input data from a computer readable medium 255. In yet another alternative example embodiment, the input unit 215 is capable of receiving a quantum of input data from a data network 260. These alternative example embodiments of an input unit 215 are intended to illustrate the operation of a system for receiving inbound data and are not intended to limit the scope of the claims appended hereto. Accordingly, the input unit 215, as described in the claims, is capable of receiving a quantum of input data from any potential data source.

Also included in several example embodiments of a system for receiving input data 205 are one or more functional modules. A functional module is typically embodied as an instruction sequence. An instruction sequence that implements a functional module, according to one alternative embodiment, is stored in the memory 220. The reader is advised that the term "minimally causes the processor" and variants thereof is intended to serve as an open-ended enumeration of functions performed by the processor 200 as it executes a particular functional module (i.e. instruction sequence). As such, an embodiment where a particular functional module causes the processor 200 to perform functions in addition to those defined in the appended claims is to be included in the scope of the claims appended hereto. Included in one example embodiment of system for receiving input data is a remote data manager module 230. The memory 220 also provides storage for one or more application buffers 245 and a request table 270. In one additional embodiment, the memory 220 is also used to store messages 250 (e.g. semaphores).

The functional modules (i.e. their corresponding instruction sequences) described thus far that enable reception of inbound data according to the present method are, according to one alternative embodiment, imparted onto computer readable medium. Examples of such medium include, but are not limited to, random access memory, read-only memory (ROM), compact disk ROM (CD ROM), floppy disks, hard disk drives, magnetic tape and digital versatile disks (DVD). Such computer readable medium, which alone or in combination can constitute a stand-alone product, can be used to convert a general-purpose computing platform into a device capable of receiving inbound data according to the techniques and teachings presented herein. Accordingly, the claims appended hereto are to include such computer readable medium imparted with such instruction sequences which enable execution of the present method and all of the teachings herein described.

In one alternative example embodiment, a memory 220 is used to store a protocol stack 235 included in this alternative example embodiment. The memory 220 is also used to store a driver module 240 included in yet another alternative example embodiment. The memory 220 is also used to store an interrupt service routine (ISR) 265 is included in yet another alternative example embodiment.

Figure 8:
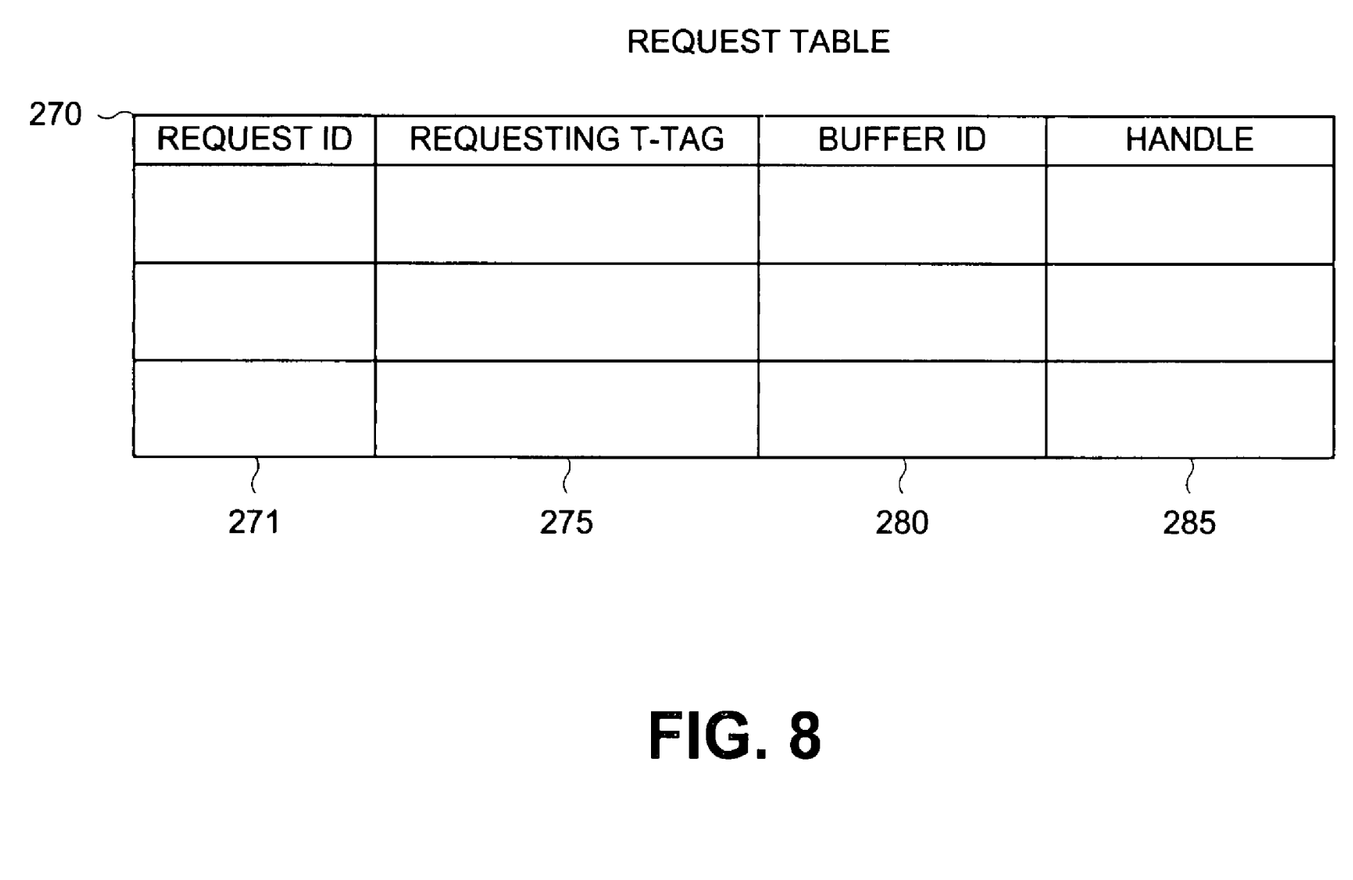
FIG. 8 is a pictorial illustration of one example embodiment of a request table.

FIG. 8 is a pictorial illustration of one example embodiment of a request table. According to one example alternative embodiment, a request table 270 is managed in the memory 220. A request table 270 is used to store a request for processing a quantum of inbound data. It should be appreciated that a request to process a quantum of inbound data is typically received from an application 225 executed by the processor 200, which are both included in one alternative example embodiment of a system for receiving inbound data 205.

It should be appreciated that a request table 270 includes one or more records, wherein each record corresponds to a pending request to process a quantum of inbound data. In one alternative example embodiment, the request table 270 includes the request identifier field to 271 in each record stored therein. The request identifier (ID) field 271 is used to store an identifier for a pending request to process inbound data. According to yet another alternative example embodiment, a record stored in the request table 270 further includes a request-tag field 275. The request-tag field 275 is used to store a request-tag associated with a particular request to process inbound data. In yet another alternative example embodiment, a record stored in the request table 270 further includes a buffer identifier field 280. The buffer identifier field is used to store the identifier for a particular pre-allocated buffer included in the application buffer 245 portion of the memory 220. In yet another alternative example embodiment, the request table 270 is used to store a record that includes a handle field 285. A handle field 285 is used to store a memory access handle, which can be used to access a particular buffer.

Figure 9:
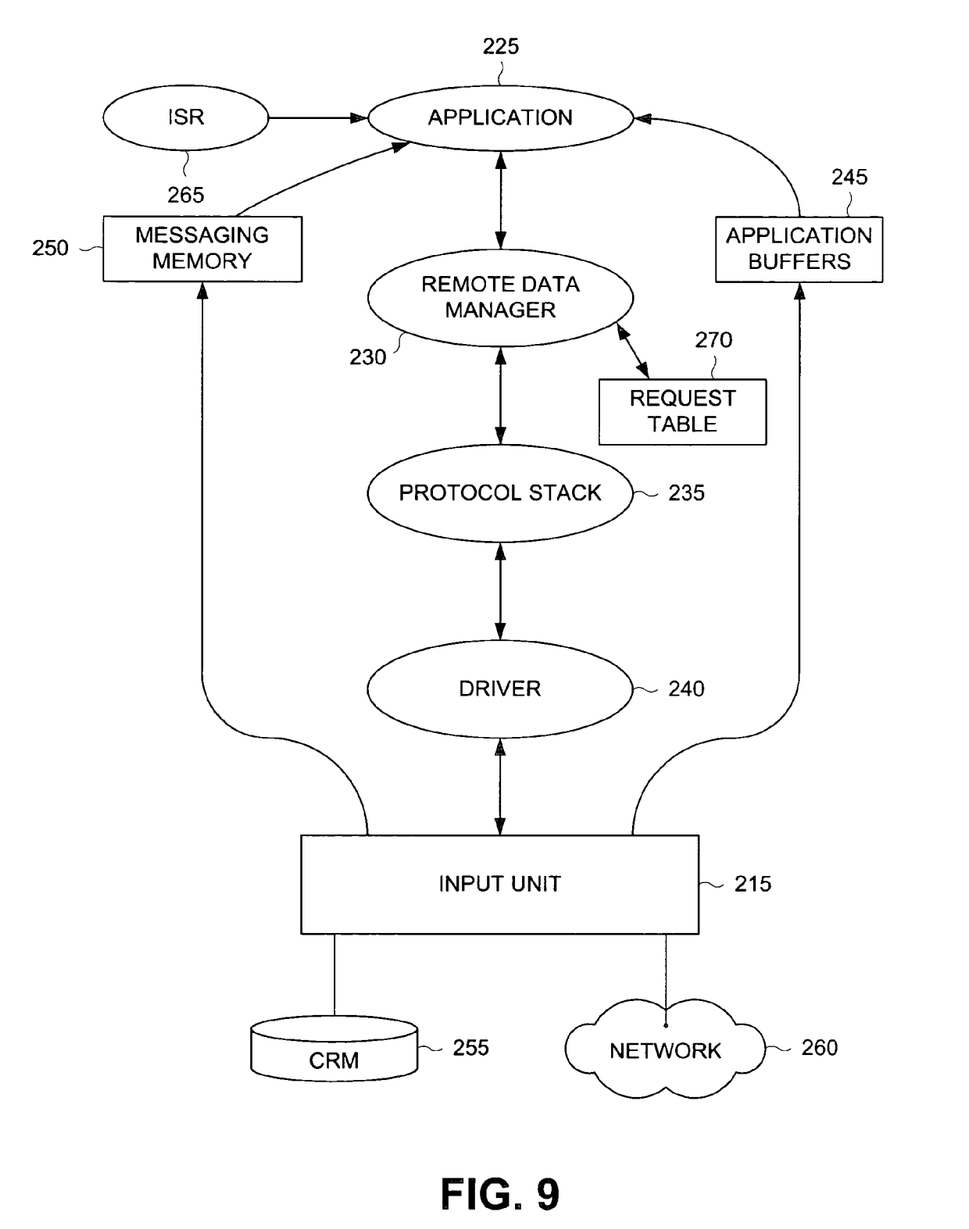
FIG. 9 is a data flow diagram that illustrates the internal operation of several example embodiments of a system receiving inbound data.

FIG. 9 is a data flow diagram that illustrates the internal operation of several example embodiments of a system receiving inbound data. According to one example alternative embodiment, a remote data manager 230 included in the memory 220 is executed by the processor. It should be appreciated that, according to this alternative example embodiment, the remote data manager 230, when executed by the processor 200, minimally causes the processor to receive a request to receiving inbound data. It should be appreciated that such a request is typically received from an application 225, which is also executed by the processor 200. It should further be appreciated that one alternative example embodiment includes the application 225. Strictly speaking, the application 225 need not necessarily be included in an embodiment of a system for receiving inbound data. Once the remote data manager module 230 causes the processor to receive a request to receive inbound data, the remote data manager module 230 further minimally causes the processor to generate a direct-data-placement request-tag and also associate the direct-data-placement request-tag with a pre-allocated buffer when a received request requires direct data placement. The remote data manager module 230 further minimally causes the processor 200 to generate a non-direct-data-placement request-tag when a received request does not require direct data placement.

Once the processor 200 generates a request-tag (as it executes the remote data manager module 230), the remote data manager module 230 further minimally causes the processor to augment a received request with a generated request-tag. The augmented request is then directed to the input unit 215. It should be appreciated that, according to one alternative example embodiment, the remote data manager module 230 causes the processor to direct the augmented request to the input unit 215 by engaging the services of a protocol stack 235 and a driver module 240. It should be appreciated that a protocol stack 235, when executed by the processor 200, minimally causes the processor to adhere to a communications protocol embodied by the protocol stack. Typically, the protocol stack 235 will cause the processor 200 to engage a driver module 240. The driver module 240, when executed by the processor 200, causes the processor to interact with a specific hardware configuration embodied in the input unit 215.

Once the input unit 215 receives a quantum of input data, it provides a reply-tag to the remote data manager 230. The remote data manager module 230, when executed by the processor 200, further minimally causes the processor to direct the input unit 215 to store a payload in a pre-allocated buffer when the reply-tag correlates with a previously-generated request-tag data is associated with a pre-allocated buffer. In operation, the remote data manager module 230 causes the processor 200 to examine individual records stored in the request table 270. This examination results in a correlation of a reply-tag received from the input unit 215 with a request-tag stored in a request-tag field 275 included in the individually examined records stored in the request table 270. In the event that a received reply-tag cannot be correlated with a particular record stored in the request table 270, the remote data manager module 230 further minimally causes the processor to retrieve a payload from the input unit 215 and also store the payload in the memory 220. Again, this occurs when a received reply-tag cannot be correlated with a particular pre-allocated buffer, wherein such correlation is accomplished by examination of records stored in the request table 270.

It should also be appreciated that the remote data manager module 230, according to one alternative example embodiment, causes the processor 200 to generate a direct-data-placement request-tag by minimally causing the processor to generate a request-tag that is identified by a first set of tag identifiers, commensurate with the teachings of the present method. In yet another alternative example embodiment, the remote data manager module 230 further minimally causes the processor 200 to generate a non-direct-data-placement request-tag by minimally causing the processor to generate a request-tag that is identified by a second set of tag identifiers, again commensurate with the teachings of the present method.

In order to direct the input unit 215 to store a payload in a pre-allocated buffer, one alternative example embodiment of the remote data manager module 230 causes the processor to retrieve a memory handle from a record stored in the request table 270. It should be appreciated that the memory handle is stored in a handle field 285 included in the record. It should further be appreciated that the memory handle is retrieved from a record that is selected according to a correlation of a received reply-tag to a request-tag stored in a request-tag field 275 in individually examined records stored in the request table 270. It should also be appreciated that the buffer identifier 280 field is used to store a buffer identifier for a particular buffer stored in the application buffer space 245 included in the memory 220. It should also be appreciated that a particular buffer identifier (and/or memory handle) is received along with a request to process a quantum of inbound data and are stored in a record created in the request table 270 request to process a quantum of inbound data is received by the processor 200 as it executes the remote data manager module 230.

Figure 10:
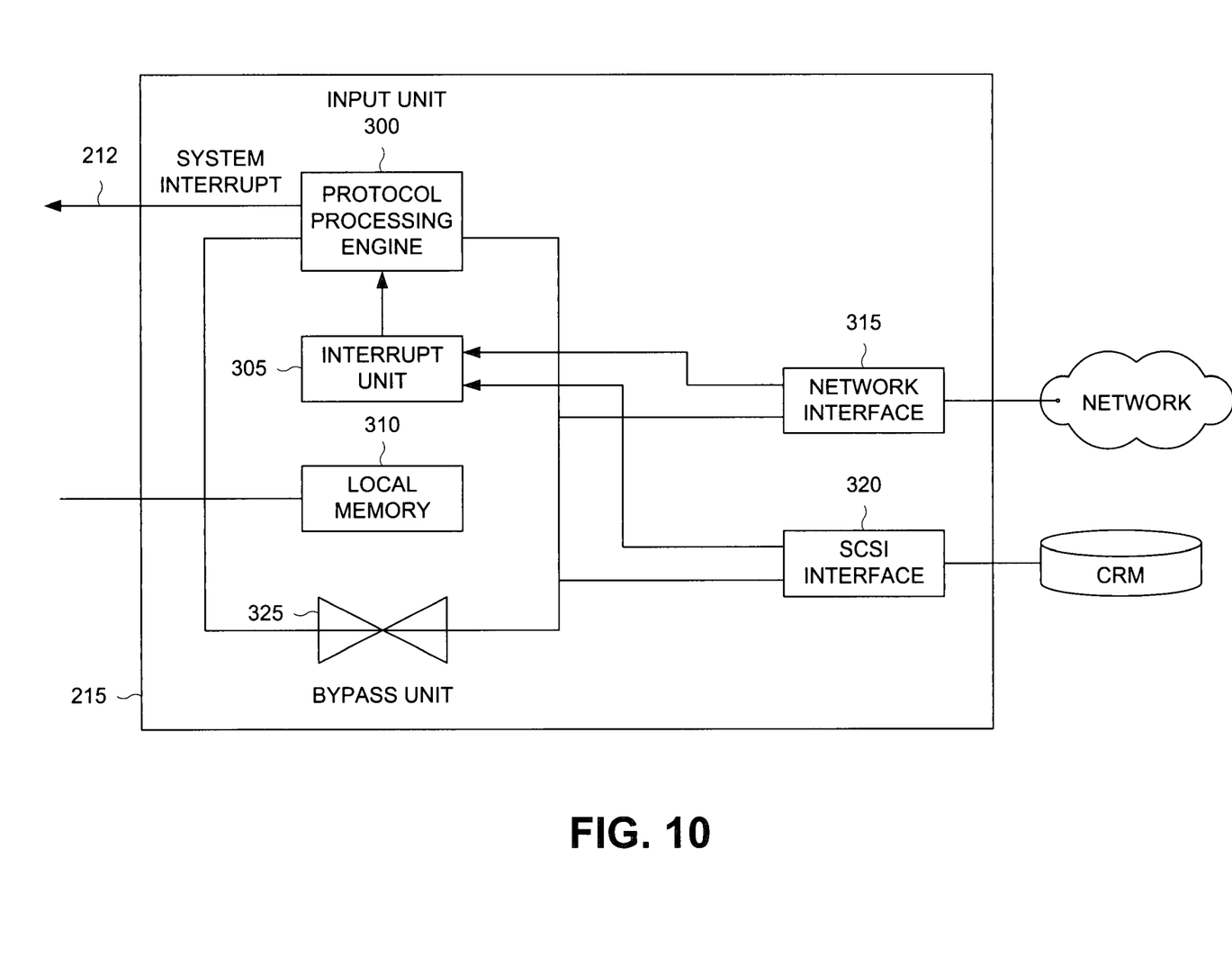
FIG. 10 is a block diagram that depicts one alternative example embodiment of an input unit.

FIG. 10 is a block diagram that depicts one alternative example embodiment of an input unit. According to this alternative example embodiment, the input unit 215 includes a protocol processing engine 300. The protocol processing engine 300 of this alternative example embodiment is capable of processing a communications protocol. For example, one alternative embodiment of the protocol processing engine 300 comprises a TCP protocol offload engine. In this alternative example embodiment, the protocol processing engine 300 directly controls a data interface. A data interface includes, but is not limited to a network interface 315, a Small Computer Systems Interface 320 or any other computer readable medium interface. Typically, the protocol processing engine 300 directs a quantum of inbound data to a local memory 310. Upon directing a quantum of inbound data to the local memory 310, an interrupt unit 305 included in this alternative example embodiment of the input unit 215 notifies the protocol processing engine 300 upon the arrival of a quantum of inbound data. In response, the protocol processing engine 300 generates a system-level interrupt 212, which is used to notify a host processor that a quantum of input data has been received. It should further be appreciated that this system interrupt, according to various alternative example embodiments, is generated either when a quantum of input data has been stored in the local memory 310 included in the input unit 215 or has been directed to an application buffer 245 in accordance with a memory access handle received by the input unit 215. Accordingly, one alternative example embodiment of a remote data manager module 230 causes the processor 200 to direct the input unit 215 to store inbound data in a pre-allocated buffer (application buffer space 245) accessible by means of a memory access handle directed to the protocol processing engine 300 included in the input unit 215.

Various types of input units provide alternative signaling facilities useful in informing the processor that a request to process input data has been serviced. These are typically called notification functions. For example, in one embodiment, the input unit 215 provides a protocol processing engine 300. The protocol processing engine 300 recognizes a termination indicator included in a header portion of a received data packet. In another illustrative embodiment, the protocol processing engine 300 recognizes a termination indicator as an independently received header. Once recognized, the protocol processing engine 300, according to one alternative example embodiment, manipulates a semaphore in the messaging memory 250 included in the memory 220. In yet another alternative example embodiment, the protocol processing engine 300 lodges a signal in the memory when a termination indicator is recognized. In yet another alternative example embodiment, the protocol processing engine 300 generates a system interrupt 212 in order to inform a host processor that a request to process inbound data has been serviced. It should also be appreciated that a host processor will execute an interrupt service routine 265 once the interrupt from the input unit 215 is acknowledged. The interrupt service routine 265 typically provides an indication to an executing application 225 that a request to process inbound data has been serviced. It should also be appreciated that the host processor (e.g. processor 200), according to one alternative example embodiment, performs any or all of the notification functions otherwise off-loaded to the protocol processing engine 300.

It should be appreciated that, according to one alternative example embodiment, the input unit 215 that includes a protocol processing engine 300 comprises an Internet Small Computer Systems Interface which is capable of receiving a data packet that includes a header and a payload. As such, the protocol processing engine 300 will receive a data packet from a data interface (e.g., a network interface 315) according to a communications protocol and will also separate a header portion from a received data packet from a payload portion of the received data packet. It should also be appreciated that, according to one alternative embodiment, the input unit extracts a reply-tag from the header portion of a received data packet and provided the reply-tag to the processor 200 as it executes the remote data manager module 230. It should also be appreciated that, according to one alternative example embodiment, the input unit 215 includes a bypass unit 325, which enables a host processor (e.g., the processor 200 included in the system 205) to directly control a data interface included in the input unit 215. In such case, the host processor will process an incoming data packet by executing the protocol stack 235 included in one alternative embodiment of a system for processing inbound data.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method comprising:
   receiving, by a processor of a computer system, a request to receive inbound data;
   generating, by the processor, a direct-data-placement request-tag and also associating the direct-data-placement request-tag with a pre-allocated buffer when the request requires direct data placement;
   generating, by the processor, a non-direct-data-placement request-tag when the request does not require direct data placement;
   augmenting, by the processor, the received request with a generated request-tag;
   directing, by the processor, the augmented request to a target device;
   receiving in a data interface unit of the computer system a data packet that includes a reply-tag and a payload;
   directing, by the processor, the payload from the data interface unit into the pre-allocated buffer when the reply-tag correlates with a request-tag that is associated with the pre-allocated buffer.

2. The method of claim 1 wherein generating the direct-data-placement request-tag comprises generating, by the processor, a request-tag identified by a first set of tag identifiers.

3. The method of claim 1 wherein generating the non-direct-data-placement request-tag comprises generating, by the processor, a request-tag identified by a second set of tag identifiers.

4. The method of claim 1 wherein directing the data from the data interface unit into a pre-allocated buffer comprises:
   receiving a handle to the specific pre-allocated buffer; and
   directing the payload to a memory according to the received handle.

5. The method of claim 1 wherein directing the data from the data interface unit into a pre-allocated buffer comprises providing a handle to a TCP protocol offload engine.

6. The method of claim 1 further comprising providing an indication to an application that the request to receive inbound data has been serviced.

7. The method of claim 6 wherein providing the indication comprises:
   recognizing a termination indicator included in a header of a data packet; and
   generating at least one of an interrupt, a semaphore and a memory based signal when the termination indicator is recognized.

8. The method of claim 1, further comprising:
   retrieving the payload from the data interface unit and also storing the payload in a memory when the reply-tag does not correlate with a request-tag that is associated with a pre-allocated buffer.

9. A system for receiving inbound data comprising:
   processor configured to execute one or more instruction sequences;
   memory configured to store one or more instruction sequences and further configured to store data;
   input unit configured to receive a packet of inbound data according to a receive request wherein a received data packet includes a reply-tag and a payload; and one or more instruction sequences stored in the memory including:
- remote data manager module that, when executed by the processor, causes the processor to:
  - receive a request to receive inbound data;
  - generate a direct-data-placement request-tag and also associate the direct-data-placement request-tag with a pre-allocated buffer in the memory when the request requires direct data placement;
  - generate a non-direct-data-placement request-tag when the request does not requires direct data placement;
  - augment the received request with a generated request-tag;
  - direct the augmented request to the input unit;
  - receive a reply-tag from the input unit;
  - direct the input unit to store a payload in the pre-allocated buffer when the reply-tag correlates with a previously-generated request tag that is associated with the pre-allocated buffer; and
  - retrieve a payload from the input unit and also store the payload in the memory when the reply-tag does not correlates with a previously-generated request tag that is associated with a pre-allocated buffer.

10. The system of claim 9 wherein the remote data manager module causes the processor to generate the direct-data-placement request-tag by causing the processor to generate a request-tag that is identified by a first set of tag identifiers.

11. The system of claim 9 wherein the remote data manager module causes the processor to generate the non-direct-data-placement request-tag by causing the processor to generate a request-tag that is identified by a second set of tag identifiers.

12. The system of claim 9 wherein the input unit is configured to receive a header and a payload.

13. The system of claim 9 wherein the remote data manager module causes the processor to direct the input unit to store a payload in a pre-allocated buffer by causing the processor to direct to the input unit a handle to a pre-allocated buffer and wherein the input unit stores a payload in the memory according to the received handle.

14. The system of claim 9 wherein the remote data manager module causes the processor to direct the input unit to store a payload in a pre-allocated buffer by causing the processor to direct to a TCP protocol offload engine a handle to a pre-allocated buffer and wherein the TCP protocol offload engine stores a payload in the memory according to the received handle.

15. The system of claim 9 further comprising an application module that, when executed by the processor, causes the processor to generate a request to receive inbound data and wherein the remote data manager module further minimally causes the processor to provide an indication to the application module that a request to receive inbound data has been serviced.

16. The system of claim 15 wherein the remote data manager module causes the processor to provide the indication by causing the processor to:
- recognize a termination indicator in at least one of a header and a header portion of a received data packet; and when the termination indicator is recognized
- at least one selected from the group consisting of: generate an interrupt to the processor; manipulate a semaphore in the memory; and lodge a signal in the memory.

17. A non-transitory computer readable medium having stored thereon one or more instruction sequences including:
- remote data manager module that, when executed by a processor, causes a processor to:
  - receive a request to receive inbound data;
  - generate a direct-data-placement request-tag and also associate the direct-data-placement request-tag with a pre-allocated buffer in a memory when the request requires direct data placement;
  - generate a non-direct-data-placement request-tag when the request does not require direct data placement;
  - augment the received request with a generated request-tag; direct the augmented request to an input unit; receive a reply-tag from an input unit;
  - direct an input unit to store a payload in the pre-allocated buffer in a memory when the reply-tag correlates with a previously-generated request-tag that is associated with the pre-allocated buffer; and
  - retrieve a payload from an input unit and also store the payload in a memory when the reply-tag does not correlates with a previously-generated request tag that is associated with a pre-allocated buffer.

18. The non-transitory computer readable medium of claim 17 wherein the remote data manager module causes a processor to generate the direct-data-placement request-tag by causing a processor to generate a request-tag that is identified by a first set of tag identifiers.

19. The non-transitory computer readable medium of claim 17 wherein the remote data manager module causes a processor to generate the non-direct-data-placement request-tag by causing a processor to generate a request-tag that is identified by a second set of tag identifiers.

20. The non-transitory computer readable medium of claim 17 wherein the remote data manager module causes a processor to direct an augmented request to an input unit by causing the processor to direct an augmented request to an Internet Small Computer Systems Interface that is capable of receiving a header and a payload.

21. The non-transitory computer readable medium of claim 17 wherein the remote data manager module causes a processor to direct an input unit to store a payload in a pre-allocated buffer by causing a processor to direct to an input unit a handle to a pre-allocated buffer.

22. The non-transitory computer readable medium of claim 17 wherein the remote data manager module causes a processor to direct an input unit to store a payload in a pre-allocated buffer by causing a processor to direct to a TCP protocol offload engine a handle to a pre-allocated buffer.

23. The non-transitory computer readable medium of claim 17 wherein the remote data manager module further causes a processor to provide an indication to an application module that a request to receive inbound data has been serviced.

24. The non-transitory computer readable medium of claim 23 wherein the remote data manager module causes a processor to provide an indication by causing a processor to:
- recognize a termination indicator in a header portion of a received data packet; and when the termination indicator is recognized
- at least one selected from selected from the group consisting of: generate an interrupt to a processor; manipulate a semaphore in a memory; and lodge a signal in a memory.

25. A system for receiving inbound data comprising:
means for receiving a request to receive inbound data;
means for generating a direct-data-placement request-tag that is associated with a means for storing a block of data when a received request requires direct-data-placement;

means for generating a non-direct-data-placement request-tag when a received request does not require direct-data-placement;

means for augmenting a received request with at least one of a direct-data-placement request-tag and a non direct-data-placement request-tag;

means for receiving a data packet that includes a reply-tag and a payload;

means for directing the payload from the means for receiving a data packet to the means for storing a block of data when an associated reply-tag correlates with a request-tag that is associated with the means for storing a block of data; and means for retrieving the payload from the means for receiving a data packet when an associated reply-tag does not correlate with a request-tag that is associated with the means for storing a block of data.

26. The system of claim 25 wherein the means for generating the direct-data-placement request-tag comprises a means for generating a request-tag that is identified by a first set of tag identifiers.

27. The system of claim 25 wherein the means for generating the non-direct-data-placement request-tag comprises a means for generating a request-tag that is identified by a second set of tag identifiers.

28. The system of claim 25 wherein the means for receiving the data packet that includes a reply-tag and a payload comprises an Internet Small Computer Systems Interface input unit.

29. The system of claim 25 further comprising a means for providing an indication to an application that a received request to receive input data has been serviced.

* * * * *

UNITED STATES PATENT AND TRADEMARK OFFICE
CERTIFICATE OF CORRECTION

PATENT NO. : 7,693,145 B2  Page 1 of 1
APPLICATION NO. : 11/187754
DATED : April 6, 2010
INVENTOR(S) : Ashok Rajagopalan et al.

It is certified that error appears in the above-identified patent and that said Letters Patent is hereby corrected as shown below:

In column 12, line 60, in Claim 24, before "the" delete "selected from".

Signed and Sealed this

Nineteenth Day of October, 2010

David J. Kappos
*Director of the United States Patent and Trademark Office*